United States Patent
Kerley et al.

(10) Patent No.: US 7,925,607 B2
(45) Date of Patent: Apr. 12, 2011

(54) TRANSACTION DATA PROCESSING SYSTEM

(75) Inventors: Paul Kerley, County Dublin (IE); Killian Colleran, Dublin (IE); Liam Griffin, County Meath (IE)

(73) Assignee: Norkom Alchemist Limited, Dublin (IE)

(*) Notice: Subject to any disclaimer, the term of this patent is extended or adjusted under 35 U.S.C. 154(b) by 907 days.

(21) Appl. No.: 11/883,933

(22) PCT Filed: Feb. 10, 2005

(86) PCT No.: PCT/IE2005/000011
§ 371 (c)(1),
(2), (4) Date: Aug. 8, 2007

(87) PCT Pub. No.: WO2006/085293
PCT Pub. Date: Aug. 17, 2006

(65) Prior Publication Data
US 2008/0162396 A1    Jul. 3, 2008

(51) Int. Cl.
*G06F 17/00* (2006.01)
*G06N 5/02* (2006.01)

(52) U.S. Cl. .................................................. 706/47

(58) Field of Classification Search .................. None
See application file for complete search history.

(56) References Cited

U.S. PATENT DOCUMENTS
6,658,393 B1    12/2003    Basch et al. .................... 705/38

FOREIGN PATENT DOCUMENTS
| WO | 98/54667 | 12/1998 |
| WO | 02/095676 | 11/2002 |
| WO | 03/001866 | 1/2003 |

OTHER PUBLICATIONS

'Genetic fuzzy systems for financial decision making': Goonatilake, 1995, 'Lecture notes in computer science', Springer Berlin / Heidelberg, pp. 202-223.*
'AI fights money laundering': Kingdon, 2004, IEEE, 1094-7167, pp. 87-89.*
XP-002328135, Grosof et al., Combining Different Business Rules Technologies: A Rationalization, Center for eBusiness @ MIT, vol. 116, 2000, pp. 1-6.

* cited by examiner

*Primary Examiner* — Michael B. Holmes
*Assistant Examiner* — Peter Coughlan
(74) *Attorney, Agent, or Firm* — Jacobson Holman PLLC

(57) ABSTRACT

A system (1) has an analysis engine (2) for analyzing transaction data (20) received in real time at an interface (3). A context generation engine—(25) directly receives transaction data (20) from the interface (3) and also macro data (26). Queue listeners (52) pull data from a shared memory queue (50(*a*), 50(*b*)) and feed it to transaction processors (53), which call a dynamic procedure (43) of the context generation engine (25) in real time. The transaction processors (53) therefore feeds transaction data and context parameters to a rule processor (61), effectively customizing the rule processor in real time. Each rule processor (61) executes a decision tree to determine the rules to execute in real time.

5 Claims, 3 Drawing Sheets

TRANSACTION DATA PROCESSING SYSTEM

This is a national stage of PCT/IE2005/000011 filed 10 Feb. 2005 and published in English.

FIELD OF THE INVENTION

This invention relates to real time processing of transaction data.

PRIOR ART DISCUSSION

U.S. Pat. No. 6,658,393 (Basch et al) describes a financial risk prediction system in which a predictive model is generated based on historical data. A current transaction authorization request may be denied if a risk score indicates an unacceptable level of risk.

The invention is directed towards providing a system for more comprehensive and versatile analysis of transaction data in real time.

STATEMENTS OF INVENTION

According to the invention, there is provided a transaction data processing system comprising:—
- an analysis engine;
- a transaction request interface for receiving transaction requests from one or more data gateways, for parsing the transaction requests to extract transaction data; for storing the transaction data in a transaction table, and for routing the transaction data to the analysis engine;
- a rule engine of the analysis engine to determine according to the transaction data rules to be used for pattern and event detection;
- a context generation engine of the analysis engine for receiving the transaction data in real time, for determining context of the transaction data, and responsive to the context, determining parameter values for the rules to be executed by the rule engine;
- means in the rule engine for analysing the transaction data by executing the selected rules with the determined parameter values and the transaction data; and
- wherein the transaction request interface, the context generation engine, and the rules engine operate in real time in response to receipt of a transaction request from a gateway.

In one embodiment, the transaction request interface routes received transaction data directly to both the context generation engine and to the rules engine.

In another embodiment, the transaction request interface comprises an extract, transform, and load tool for extracting the transaction data from received transaction requests, and for writing said transaction data to the transaction table.

In a further embodiment, the transaction request interface comprises a notification function for receiving a trigger from the transaction table, and/or, in response, writing transaction data to a shared memory.

In one embodiment, the shared memory is in a queue processor of the rule engine.

In another embodiment, the rule engine comprises a plurality of parallel queue listeners monitoring queues fed by the shared memory.

In a further embodiment, each queue listener feeds a transaction processor.

In one embodiment, each transaction processor calls a procedure of the context generation engine to retrieve a context.

In another embodiment, the context generation engine comprises a plurality of procedures available to be called by the transaction processors.

In a further embodiment, each procedure is an instantiated object capable of providing contexts for different types of transactions.

In one embodiment, the context generation engine comprises data tables including an event detection table, a macro data table, and profile table, and a procedure object dynamically generates a context using data retrieved from said tables.

In another embodiment, each transaction processor feeds transaction data and context to a rule processor to execute rules.

In a further embodiment, each rule processor is universal, and is configured in real time according to the data fed to it by the transaction processor.

In one embodiment, each rule processor dynamically determines a sub-set of the rules for the set selected for the mode of operation, and executes these rules.

In another embodiment, each rule processor executes a decision tree to determine the rules to execute.

In a further embodiment, each rule processor feeds a score to a score writer process, and the score writer process dynamically updates the transaction table.

In one embodiment, the score writer process is universal, and a plurality of score writer processes are instantiated at any time.

DETAILED DESCRIPTION OF THE INVENTION

Brief Description of the Drawings

The invention will be more clearly understood from the following description of an embodiment thereof, given by way of example only, with reference to the accompanying drawings, in which:—

DESCRIPTION OF THE EMBODIMENTS

Figure 1:
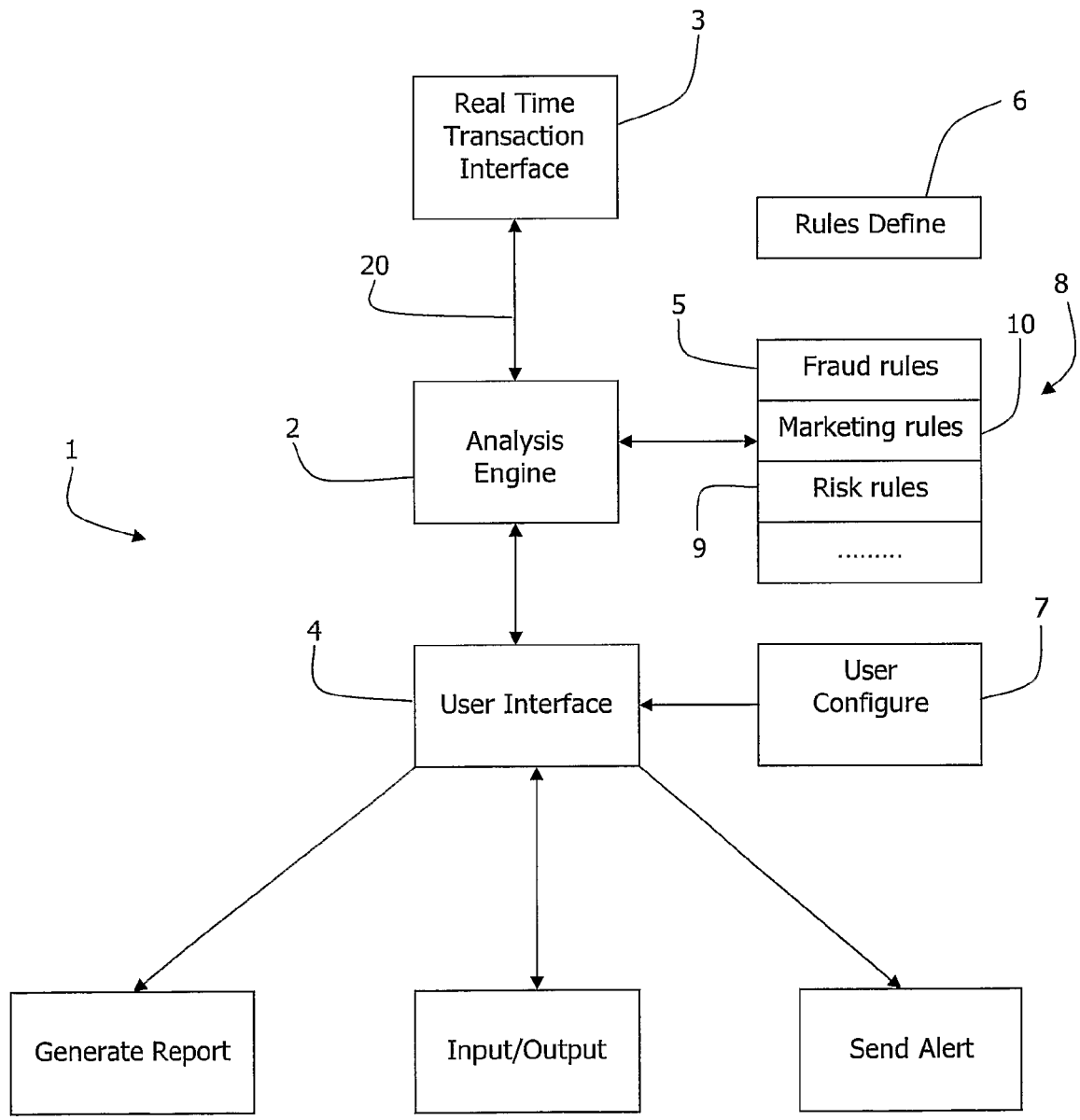
FIG. 1 is a schematic illustration of a transaction data processing system of the invention.

Referring to FIG. 1, there is illustrated a transaction data processing system 1 for analysing transaction data to automatically detect data patterns and events for particular transactions according to different applications. The system 1 is suitable for analysing data in a variety of different data analysis applications. For example, the system 1 may be employed as an anti money laundering system, and/or as an anti fraud system, and/or as a business performance system, and/or as a risk management system, and/or as a watch list management system, and/or as a marketing system. It has the capability of handling in real time very high volumes of transactions, even though the pattern matching and processing may be complex.

The system 1 comprises an analysis engine 2 for analysing transaction data 20 received from one or more data gateways feeding into a real time transaction interface 3, and a user interface 4 for communicating the results of the data analysis from the analysis engine 2 to a user.

The system 1 has a rule base 8 including sets 5, 9, and 10. Each set of rules in the rule base 8 may have thousands of rules. In real time, the analysis engine 2 uses are of these rule sets, and dynamically determines appropriate rules of the set to apply, dynamically configures these rules, and executes them to identify patterns and based on the profiles of activity that are being monitored.

Figure 2:
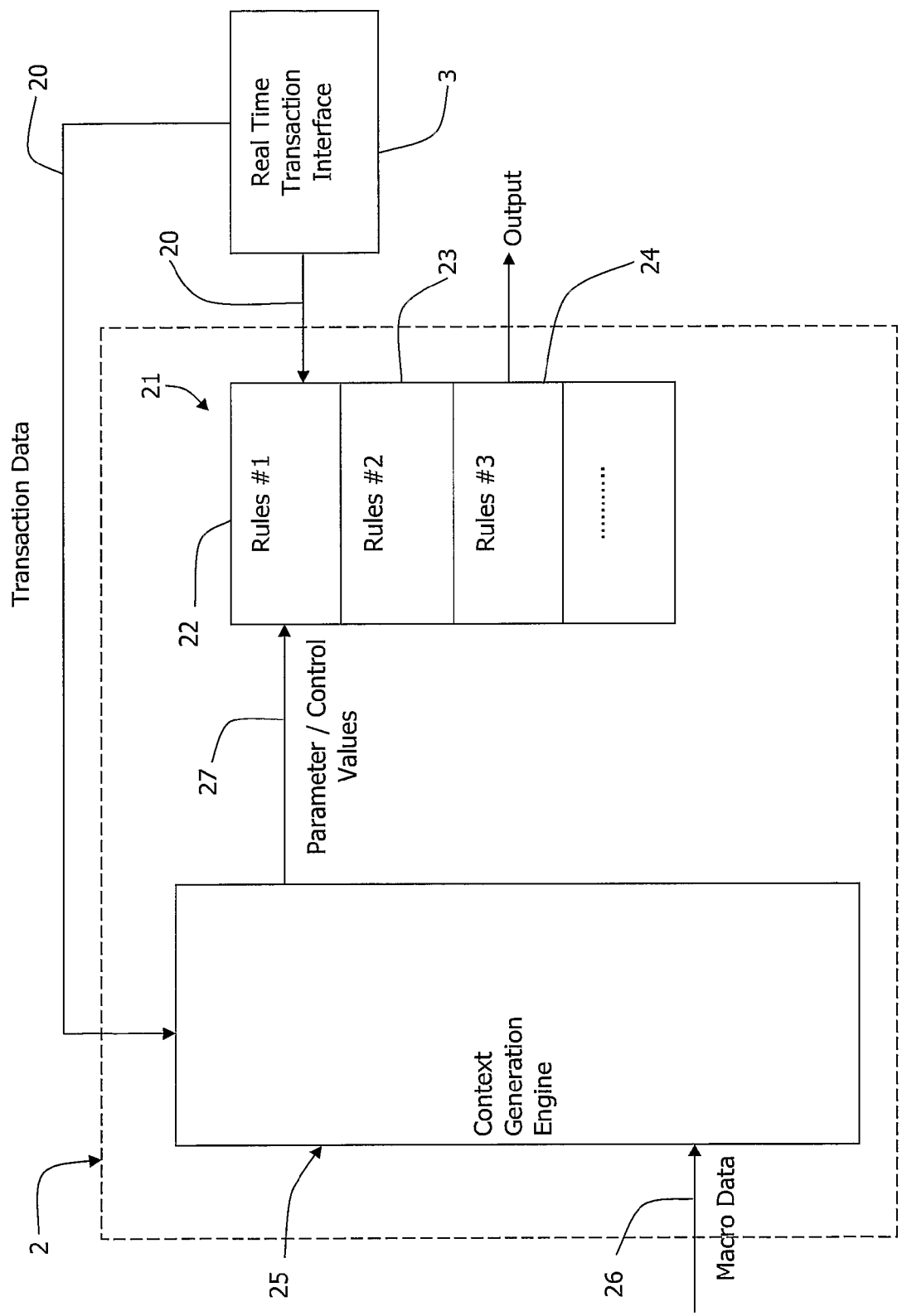
FIG. 2 is a more detailed illustration of an analysis engine and a real time transaction interface of the system.

Referring to FIG. 2, the analysis engine 2 is illustrated in further detail. The analysis engine 2 includes a context generation engine 25 which directly receives transaction data 20 from the real time transaction interface 3, and also receives external macro data 26 such as time and date data. The analysis engine 2 also includes a rules engine 21 which also directly receives the transaction data 20 from the transaction interface 3.

With reference to FIG. 2, the transaction interface 3 in real time receives transaction requests from, for example, a transaction processing network such as a credit card network. The interface 3 dynamically parses the requests to extract certain key transaction data and automatically routes this data to both the context generation engine 25 and to the rules engine 21. The rules engine 21 has the rule set previously determined and received from the rule base 8.

The context generation engine 25 provides an input to processing depending on what we refer to as the "context" of the transaction data 20. The context of the transaction data 20 may include information as to how the current transaction data compares to previous transaction data from the same source, for example a particular customer. The context may also include information as to how the transaction data from one source compares to the transaction data from other comparable sources. The context may also include information as to how the transaction data compares to absolute values or to relative values. The context generation engine 25 takes into account all factors in the context of the transaction data 20 in calculating the parameter values.

The context generation engine 25 calculates the parameter values for each of the rules in each of the sub-layers 22, 23, 24 responsive to the transaction data 20 and the macro data 26 received. The updated parameter values are fed into the rules engine 21 as the parameter data 27, and the parameter values of each of the rules in each of the sub-layers 22, 23, 24 are updated.

The rules engine 21 then analyses the transaction data 20 according to dynamically selected set of rules with the updated parameter values.

The total number of rules in the set may be very large, for example 900 rules to analyse all possible fraud circumstances. To reduce the total number of rules that the transaction data 20 needs to be checked against, the set of fraud rules is divided into the sub-layers 22, 23, 24.

The transaction data 20 is initially analysed by the rules engine 21 using the first sub-layer 22 of rules. Only if a decision is not reached using the first sub-layer 22 of rules, is the transaction data 20 analysed using the second sub-layer 23 of rules. If a decision is reached using the first sub-layer 22 of rules, the remaining sub-layers 23, 24 . . . are not used to analyse the transaction data 20. Similarly, only if a decision is not reached using the second sub-layer 23 of rules, is the transaction data 20 analysed using the third sub-layer 24 of rules. If a decision is reached using the second sub-layer 23 of rules, the remaining sub-layers are not used.

Figure 3:
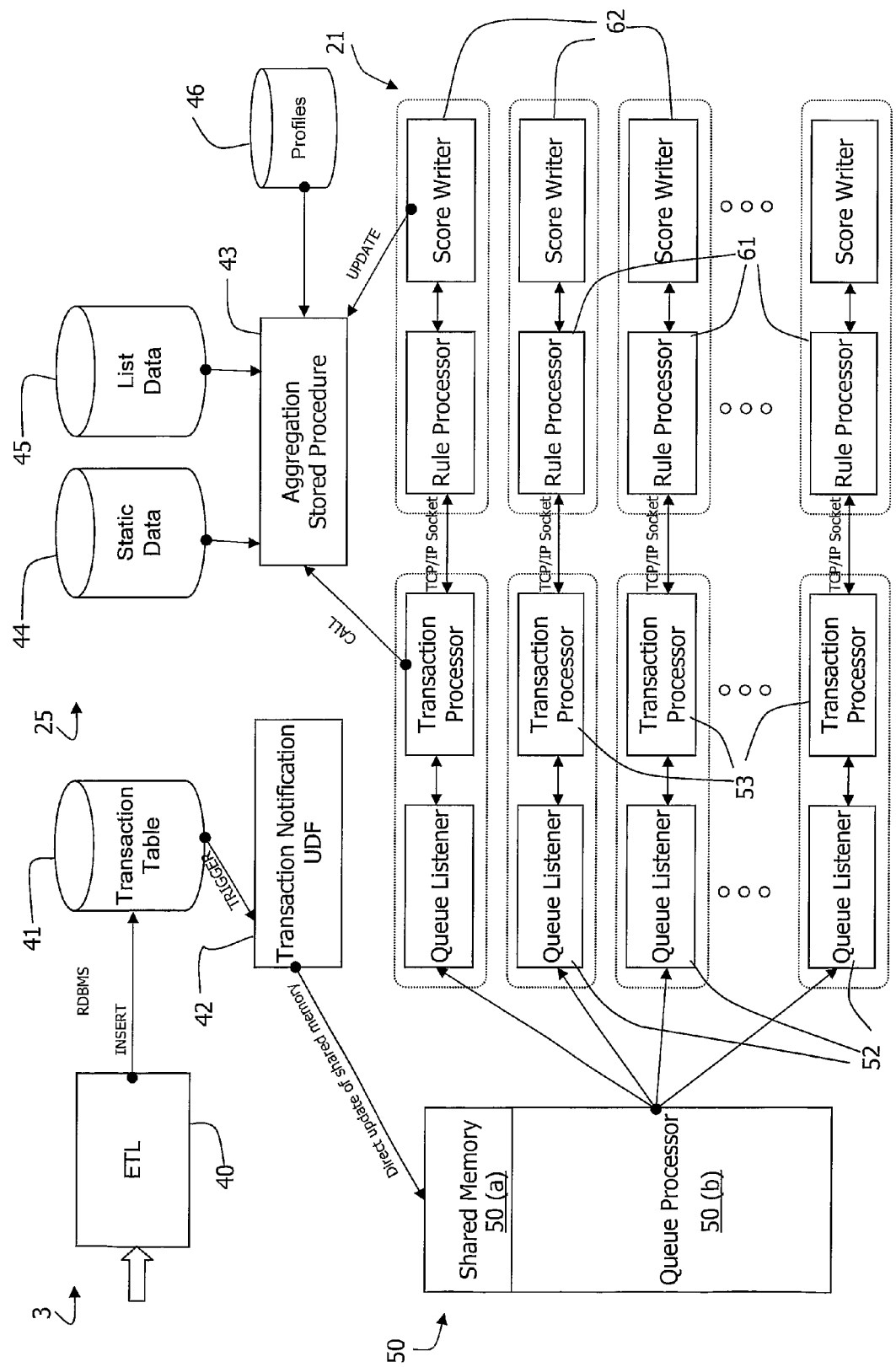
FIG. 3 is a more detailed illustration of components of the system.

FIG. 3 illustrates the transaction interface 3, the rules engine 21, and aspects of the context generation engine 25 in further detail. The transaction interface 3 includes an ETL (extract, transform, and load) tool 40 which receives the transaction data from the source systems and presents it to RDBMS components of the interface 3. The RDBMS components include a transaction table 41 and a transaction notification user-define function (UDF) 42. An update to the transaction table 41 causes a trigger of the UDF 42, which in turn writes an update to a memory of the rules engine 21.

The context generation engine 25 comprises an aggregation stored procedure 43 which draws data from static data tables 44, hot/watch/exclude test tables 45, and profile tables 46. The procedure 43 is database resident and is in practice a group of many currently-instantiated objects. Each such object is similar, thus providing a multiple, parallel context—processing capacity. An object 43 is called by a transaction processor of the rules engine 21.

The tables 44, 45, and 46 are very frequently updated with fresh data.

In the rules engine 21 a queue processor 50 has a shared memory 50(a) and queues 50(b) feeding multiple queue listeners 52, in turn each feeding a transaction processor 53. Each transaction processor 53 is linked by a TCP/IP socket to a rule processor 61 interfacing with a score writer 62.

Both the transaction processors 53 and the rule processors 61 are generic parallel processors objects instantiated for a session. Because they are generic, they can handle any transaction which arrives in the queue processor 50 with optimum load balancing. The processors 53 and 61 become specific by the queue listener 52 feeding transaction data and by the transaction processor 53 calling a UDF object 43 of the context generation engine. Each rule processor 61 becomes specific by using the Rhete algorithm to search in real time through a decision tree and executes rules at leaf nodes of the decision tree. Thus, the rule processors 61 can deal with hundreds of detection scenarios on the basis of differences in supplied transaction date and context.

The ETL tool 40 inserts a transaction into the table 41. A database trigger causes the UDF 47 to write a notification that the new transaction has arrived and is ready for processing. This notification is written to a queue so that performance of the insert is not impacted by performance of the aggregation and scoring.

New transactions are read from the shared memory queue 50(a) in the processor 50 by a listener 52, which supplies it to a transaction processor 53. The transaction processor 53 calls a context generation procedure object 43 and then notifies a Java rule processor 61. The rule processor 61 is linked directly to a specific transaction processor 53 as scoring will typically take less time than aggregation, hence negating any benefit that might be gained from isolating the two processes by means of another queue. It will be appreciated from the above that the transaction processors 53 effectively call in the relevant procedures from the context generation engine 25 using the stored procedures 43.

Since each rule processor 61 receives its transactions directly from a dedicated transaction processor 53 there is no need for additional locking/control mechanisms.

Having scored the transaction, the rule processor 61 then passes the scores to a score writer 62 that uses a pre-defined statement to update the transaction in the table 41.

Once the transaction has been scored the queue listener 52/transaction processor 53 is notified so that another transaction can be processed.

The queue listeners 52, transaction processors 53, and their associated rule processors 61 provide excellent throughout because of their parallel arrangement. The number of sets of queue listeners 52/transaction processor 53/rule processors 61 may be varied dynamically to optimise system performance.

The maximum size of the message queue will be adjusted to allow for peak volumes. There is an upper limitation on the size of shared memory that can be accessed by the queue processor 50 and therefore an upper limit on the number of transactions that can be queued. Because the message queue is memory based, failure of the machine will cause the queue to be flushed. The recovery process is to query the un-scored transactions from the database table 41 and re-populate the queue with the list of transactions.

This method could also be used to re-score transactions.

The ETL tool 40 inserts each received transaction into the transaction table 41, before completing the handshake to indicate that the transaction has been received and stored. The insert will cause a post-insert database trigger to be fired which in turn will cause the transaction notification UDF 47 to be called.

The UDF 47 is written entirely in C and does not contain any SQL. As such it can be flagged as NO SQL and NOT FENCED in order to optimise performance. This function writes the transaction details required by the context aggregation stored procedure 42 to the shared memory transaction queue 50(*b*). This queue 50(*b*) is based on shared memory so the increase in insert latency as a result of the call to the UDF 42 should be minimal.

Many more transactions could be stored in the queue processor 50 if only the transaction key were inserted into the queue. However this would mean that the context aggregation stored procedure 43 would have to query the transaction table 41 one additional time in order to get the details. The gain in performance achieved by not having this query outweighs the reduction in queue size.

The shared memory buffer 50(*a*) is capable of storing a configurable number of transactions. The theoretical upper limit on the queue size is determined by the maximum allowable segment size (2.75 GB) and the size of the data structure required to store the transaction details. This upper limit is approximately 11 million transactions) In order to queue a typical day's worth of transactions (assume 2.5 million) the queue would require approximately 610 MB of RAM. The queue processor 50 establishes a standard UNIX message and waits for requests from the transaction processor 53 processes. When a request is received it takes a message off the transaction queue and passes it to the transaction processor 53 for processing. The queue processor 50 is also responsible for creating and destroying the transaction queue. It is also responsible for recovering transactions that failed to be processed prior to the context being generated. Recovered transactions are simply placed on the queue to be processed along with other transactions. When the queue processor 50 terminates it saves the unprocessed transactions in the queue to a file.

Each queue listener 52 waits for messages to arrive in the UNIX message queue. When a message arrives it is removed and passed to the associated transaction processor 53. The queue listener 52 and transaction processor 53 are part of the same UNIX process. During start-up this process also starts an associated rule engine process to implement the processor 61 and initialises a TCP/IP socket to enable communication between the two processes.

Each transaction processor 53 calls a context aggregation stored procedure object 43 for the specified transaction and receives a transaction context in return. Once received this context is written to the TCP/IP socket that is being listened on by the rule processor 61 linked to this process during start-up.

The transaction processor 53 then waits for an acknowledgement from the associated score writer 62, before instructing the queue listener 52 to retrieve another transaction from the UNIX message queue.

Any transactions that fail prior to the context being generated are recorded in the failed transaction log. This file can be processed by the transaction queue 50(*b*) for later recovery. Any transactions that fail after the context has been generated are recorded in the failed context log. This file can be processed by the transaction processor 53 for later recovery. The transaction processor 53 is capable of being configured to record the generated context for audit/test purposes. The transaction processor 53 and the queue listener 52 are part of the same UNIX process. During start-up this process also starts an associated rule process or 61 and initialises a TCP/IP socket to enable communication between the two processes.

The context aggregation procedure objects 43 do the aggregation of the transaction/static data and returns the aggregated data to the transaction processor 53.

The rule processor 61 will receive a transaction context string from the TCP/IP socket linked to its associated transaction processor 53 and then transform this string into a Java object that can be asserted into the rule processor 61. The rule function 61 will calculate the scores based on the current set of active rules. Once the scores have been calculated, they are passed to the score writer 62.

The rule processor 61 and the score writer 62 are part of the same UNIX process and share their own JVM.

The score writer 62 does a parameterised update of the record in the table 41 and writes only the scores to the transaction data in the table 41. Once the transaction process has been written to the table 41, an acknowledgement is sent back to the transaction processor 53 to indicate that the scoring is complete. The score writer 62 and the rule processor 61 are part of the same UNIX process and share their own JVM.

Transaction recovery is manually initiated. This restriction is in place in order to prevent failing transactions from being repeatedly processed and consequently impairing performance of the processing of normal incoming transactions. Recovery of transactions can take place at two times: before a transaction has had its context generated and after the context has been generated. This ensures that if the context has been generated but not scored that it is not necessary to regenerate the context. This approach reduces the performance impact of recovery.

Recovery of transactions that fail before the context is generated is done by starting the transaction queue process in recovery mode. This will ensure that the failed transaction log from the previous execution is used as the recovery file for the next invocation.

Recovery of transactions that fail after the context is generated is done by starting another instance of a transaction processor process 53 which is configured to load the specified failed context log. These recovery mechanisms address failure of individual software components within the processing cycle. They do not address catastrophic failure of the hardware, such as complete CPU/memory failure. If such an event occurred, transactions can be recovered by querying the transaction table 42 for those transactions yet to be scored and passing their details to the transaction notification UDF 47.

Referring again to FIG. 1, further aspects of the system 1 will now be described.

The user interface 4 is configured to facilitate selection by the user of the particular data analysis application that the user intends to employ the system 1 as. For example the user may select at the interface 4 that the user wishes to employ the system 1 as an anti fraud system.

The rule base 8 may also include a set of rules for analysing data to detect money laundering activities, and/or a set of rules for analysing data to determine business performance, and/or a set 9 of rules for analysing data to determine risk, and/or a set of rules for analysing data to detect activities of an entity on a watch list, and/or a set 10 of rules for analysing data to plan/monitor marketing activities.

The system 1 also comprises a rules define module 6 which enables a system administrator to define each of the rules in each of the sets of rules. The rules define module 6 thus enables the system administrator to control how the system 1 analyses data for each application. In addition, the rules define module 6 enables the system administrator to modify/update any of the rules in any of the sets of rules, for example if new fraud detection regulation is required.

The user interface 4 comprises a graphical user interface which graphically displays the results of the data analysis to the user. The user interface 4 may also be used to generate one or more reports to communicate the results of the data analysis to the user. As a further alternative the user interface 4 may be used to transmit alerts, such as an e-mail, or an SMS message, to the user to communicate the results of the data analysis to the user.

The user is presented with a graphical user interface that highlights the alert that has been generated, why it has been generated and of all the relevant information that the user requires to make a decision with regard to the alert.

Once the user makes a decision, this decision is then routed to the next step in the defined workflow. This action is audited and time-stamped. Multiple actions can be performed by different users. This is fully audited.

The system 1 further comprises a user configure module 7. The user configure module 7 is generates a graphical user interface, and enables a user to configure the user interface 4 to achieve communication of the results of the data analysis to the user in a particular desired format.

The user configure module 7 may enable a user to configure the user interface 4 in any suitable manner. For example, drag-and-drop functionality may be employed to enable a user to choose how the results of the data analysis will be communicated to the user.

The user interface 4 may further be used to input data, which the analysis engine 2 may store in an appropriate database. In this manner the system 1 facilitates data feedback into the database, such as feedback from the results of a marketing campaign. The system 1 thus has adaptive learning capabilities.

The real time transaction interface 3 may be located locally in proximity to the analysis engine 2. Alternatively, the real time transaction interface 3 may be located remotely from the analysis engine 2. The real time transaction interface 3 may be connected to the analysis engine 2 in any suitable manner.

It will also be appreciated that the system 1 may receive the transaction data from any suitable data gateway In use, the system administrator defines each of the rules in each of the sets in the rule base 8. The user then configures the user interface 4 using the user configure module 7 to ensure that the results of the data analysis are communicated to the user in the particular desired format.

The user selects at the user interface 4 the particular data analysis application that the user wishes to employ the system 1 as, for example as an anti fraud system. In addition to determining the appropriate set of rules to apply in response to the transaction data 20 received, the analysis engine 2 may also determine the appropriate set of rules in response to the particular data analysis application which has been selected be the user. The analysis engine 2 then analyses the data according to the appropriate set of rules determined, in this case the set 5 of fraud rules, as described above. The user interface 4 communicates the results of the data analysis to the user in the particular desired format. This may be by graphically displaying the results, and/or by generating reports, and/or by transmitting alerts.

To provide data feedback into a database, the user may input data at the user interface 4, and the analysis engine 2 stores the data in an appropriate database.

There are a number of significant advantages/benefits to allowing the user to feed data back into the database:

There is a cost and time saving for the business in being able to make changes without the need to involve an administrator or IT support.

There is a flexibility for the business in being able to make changes without the need to explain what changes are required to either an administrator or IT support.

There is a flexibility for the business in being able to tune the system without the need to explain what changes are required to either an administrator or IT support.

Users being able to feedback also helps the system to learn the most appropriate response to a given scenario.

Ownership of the detection scenarios then rests with an organisation.

The secrecy of the rules can be protected by minimising who within the organisation can view the rules.

The system of the invention is also suitable for other applications such as: detecting employee fraud, name matching, cross sell and up sell, churn analysis, revenue assurance, travel optimisation, logistics, investment banking, corporate banking, telecommunications, retail banking, securities, airlines, transportation, internal security detecting potential terrorist behaviour, insurance.

The invention is not limited to the embodiment hereinbefore described, with reference to the accompanying drawings, which may be varied in construction and detail.

The invention claimed is:

1. A transaction data processing system stored in a non-transitory computer readable medium, the system comprising:

an analysis engine;

a transaction request interface for receiving transaction requests from one or more data gateways, for parsing the transaction requests to extract transaction data; for storing the transaction data in a transaction table, and for routing the transaction data to the analysis engine;

a rule engine of the analysis engine to determine according to the transaction data rules to be used for pattern and event detection;

a context generation engine of the analysis engine for receiving the transaction data in real time, for determining context of the transaction data, and responsive to the context, determining parameter values for the rules to be executed by the rule engine;

means in the rule engine for analysing the transaction data by executing the selected rules with the determined parameter values and the transaction data;

wherein the transaction request interface, the context generation engine, and the rules engine operate in real time in response to receipt of a transaction request from a gateway;

wherein the transaction request interface routes received transaction data directly to both the context generation engine and to the rules engine;

wherein the transaction request interface comprises an extract, transform, and load tool for extracting the transaction data from received transaction requests, and for writing said transaction data to the transaction table;

wherein the transaction request interface comprises a notification function for receiving a trigger from the transaction table, and for, in response, writing transaction data to a shared memory;

wherein the shared memory is in a queue processor of the rule engine;

wherein the rule engine comprises a plurality of parallel queue listeners monitoring queues fed by the shared memory; and wherein each queue listener feeds a transaction processor; and wherein each transaction processor calls a procedure of the context generation engine to retrieve a context; and wherein the context generation engine comprises a plurality of procedures available to be called by the transaction processors; and wherein each procedure is an instantiated object capable of providing contexts for different types of transactions; and wherein the context generation engine comprises data tables including an event detection table, a macro data table, and profile table, and a procedure object dynamically generates a context using data retrieved from said tables.

2. A non-transitory computer readable medium comprising software code for implementing operations of a transaction data processing system of claim 1 when executing on a digital computer.

3. A transaction data processing system stored in a non-transitory computer readable medium, the system comprising:

an analysis engine;

a transaction request interface for receiving transaction requests from one or more data gateways, for parsing the transaction requests to extract transaction data; for storing the transaction data in a transaction table, and for routing the transaction data to the analysis engine;

a rule engine of the analysis engine to determine according to the transaction data rules to be used for pattern and event detection;

a context generation engine of the analysis engine for receiving the transaction data in real time, for determining context of the transaction data, and responsive to the context, determining parameter values for the rules to be executed by the rule engine;

means in the rule engine for analysing the transaction data by executing the selected rules with the determined parameter values and the transaction data;

wherein the transaction request interface, the context generation engine, and the rules engine operate in real time in response to receipt of a transaction request from a gateway;

wherein the transaction request interface routes received transaction data directly to both the context generation engine and to the rules engine;

wherein the transaction request interface comprises an extract, transform, and load tool for extracting the transaction data from received transaction requests, and for writing said transaction data to the transaction table;

wherein the transaction request interface comprises a notification function for receiving a trigger from the transaction table, and for, in response, writing transaction data to a shared memory;

wherein the shared memory is in a queue processor of the rule engine;

wherein the rule engine comprises a plurality of parallel queue listeners monitoring queues fed by the shared memory; and wherein each queue listener feeds a transaction processor; and wherein each transaction processor feeds transaction data and context to a rule processor to execute rules; and wherein each rule processor is universal, and is configured in real time according to the data fed to it by the transaction processor; and wherein each rule processor feeds a score to a score writer process, and the score writer process dynamically updates the transaction table.

4. The system as claimed in claim 3, wherein the score writer process is universal, and a plurality of score writer processes are instantiated at any time.

5. A non-transitory computer readable medium comprising software code for implementing operations of a transaction data processing system of claim 3 when executing on a digital computer.

* * * * *